United States Patent [19]

Cerboni

[11] Patent Number: 4,538,978
[45] Date of Patent: Sep. 3, 1985

[54] ROTARY PISTON FORMING MACHINE FOR CHOCOLATE

[75] Inventor: Renzo Cerboni, Milan, Italy

[73] Assignee: Carle & Montanari S.p.A., Milan, Italy

[21] Appl. No.: 578,561

[22] Filed: Feb. 9, 1984

[30] Foreign Application Priority Data

Apr. 14, 1983 [IT] Italy .............................. 20589 A/83

[51] Int. Cl.³ .......................... B29C 5/00; A23G 3/18
[52] U.S. Cl. .................................... 425/206; 222/271;
222/488; 366/77; 425/207; 425/209; 425/257;
425/447
[58] Field of Search ............... 425/418, 586, 200, 205,
425/208, 209, 256–258, 259, 261, 447; 366/77;
222/271, 273, 484, 488

[56] References Cited

U.S. PATENT DOCUMENTS

4,213,209 7/1980 Valsamis ............................... 366/77
4,332,480 6/1982 Anders ................................... 366/77
4,421,412 12/1983 Hold et al. ............................ 366/77

Primary Examiner—Willard E. Hoag
Attorney, Agent, or Firm—Kalish & Gilster

[57] ABSTRACT

A forming machine for chocolate and the like which comprises, located directly downstream of the hopper, a metering device having a contoured mixing and metering cavity which accommodates a rotatively driven rotor provided with disk-like spaced-apart collars and with rotary pistons respectively in the form of bridges interconnecting said disk-like collars axially. On the interior of said mixing and metering cavity, said rotor defines, accordingly, movable metering chambers in the shape of annular segments at one side, in each whereof there is respectively reciprocable a detent segment of a respective oscillating delivery disk valve and formed on a common shaft element, and a mixing chamber at the other side. Provided in said valves is a throughgoing passage which opens below the forming machine lower plane, and a depression for the unhindered passage of the respective rotary piston.

17 Claims, 4 Drawing Figures

ROTARY PISTON FORMING MACHINE FOR CHOCOLATE

BACKGROUND OF THE INVENTION

This invention relates to a forming method and forming machine for chocolate and the like, such as fondant, nougat, creams, etc. With this premise, reference will be simply made hereinafter to chocolate.

As is known, conventional forming machines are used for the metered transfer of chocolate from a hopper containing it into forming plates or molds to form a desired product, such as chocolate bars, candies, stuffed candies, etc. Forming machines conventionally comprise in essence one or two hoppers containing stirring means and opening into a respective rotary valve chamber provided with throughgoing passages and being associated, on the one side, with a metering unit for metering out a desired amount of the product, and on the other side, with conduits in the forming machine which open into holes or channels of molding plates associated with the forming machine at the bottom thereof. The metering units comprise a cylinder-piston units which are provided laterally to said rotary valves, and during a rotation phase thereof, are communicated to a respective hopper compartment, and as the pistons are removed rearwardly, effect the suction of a given metered amount of chocolate into the respective cylinder, thereafter, with said rotary valves turned to a successive position, through the outward movement of the pistons, they determine the delivery of said chocolate through outlet conduits from the forming machine which lead into the holes or conduits in the cited forming plates.

A known construction of the forming machine and forming plates is disclosed, for example, in Italian Pat. No. 488,620 to this same Applicant.

Also known in the art is that chocolate is in a pre-crystallization state in forming machines, so that only very short processing times are available to prevent the onset of crystallization, which is to occur subsequently to forming. Thus, it is extremely important that the chocolate temperature be maintained as accurately as possible from the hopper to the forming plates or molds.

Prior forming machines have in practice several disadvantages and deficiencies of constructional, functional, and physic-structural characters as regards their action on the chocolate, the most important whereof are listed here below:

The utilization of cylinder-piston units, or reciprocating units, located on the outside, which increases considerably the machine space requirements.

The use of cylinder-piston units allows the utilization of forming machines having at most two hoppers, and accordingly, two sets of cylinder-piston units on the machine opposed sides. Thus, in the instance of chocolate candies including three or more ingredients or different qualities, it becomes necessary to arrange two successive forming machines in series, with attendant increased bulk and substantial investment cost.

With prior cylinder-piston units, the pistons, during their backward stroke, or chocolate loading stroke, come out of the cylinder casings and are, therefore, fully exposed to air and bacterial load of the environment.

The entire inner lateral surface of the cylinders forms a frictionsurface acting on the chocolate being displaced, which results in the same being crystallized, thereby a circumferential chocolate film is formed which tends to harden and seize the pistons. Upon the occurrence of each seizure, the machine must be stopped for cleaning. The net result is loss of production and increased labor attendance.

In the instance of sugar fondant, in order to avoid the crystallization of the sugar film on the pistons in their outward movement, it is common practice to accept the continuous loss of that sugar film, as well as continued wetting of the pistons with water, which obviously represents an economical disadvantage and waste of product.

At the end of each daily working shift the cylinder-piston unit must be accurately cleaned to ensure its reliable operation as the machine is started at the next shift. Such cleaning operations are time-consuming and must be performed with care, it involving disassembling the pistons, washing the pistons and cylinders, and perfectly drying them to eliminate all traces of moisture and minimize the environmental load on such parts. Moreover, application of a thin film of cocoa butter would be advisable.

In the cylinder-piston units, sealing is accomplished by means of gaskets, that is, parts which are liable to wear out.

In order to change the piston stroke length, that is to vary the amount of product being metered out, prior units require complex linkages formed by several parts articulated to one another. These are difficult to keep adjusted, especially evenly adjusted between units.

Owing to different manufacture tolerances of the individual parts, on the one side, and the stresses and unavoidable wear on the other side, different clearances appear at the various units, and accordingly, different amounts being metered out of the finished product. Since the product weights are assessed at tolerances of tenths of a gram, such clearances pose considerable difficulties owing to strict weight tolerance regulations being applied in the various countries.

Leaky gaskets result in the metered amounts of chocolate incorporating air bubbles, which are retained in the finished product, thus creating well known difficulties when this is to be ejected.

The volume output rate is low, because it depends, in addition to the product viscosity, also on a perfect seal at the gaskets and on the clearances present, in particular an improper seal causing the adduction of air and formation of air bubbles as above.

With conventional reciprocating units, metering is accompanied by "violent" actions on the chocolate. In fact, a loading step is first carried out by "sucking" the chocolate from the hopper through the rotary valve into the cylinder, and then a step of delivery of the same from the cylinder into the rotary valve. Of course, during the "suction" step a "stretching" action is applied on the chocolate being introduced into the cylinder, and during the following delivery step the chocolate undergoes a squeezing action. Thus, such actions are "violent" and as is known affect and deprive the product of its final shine, a feature much sought after.

Long travel distance paths are provided for the chocolate to reach the forming plates or molds from the hopper, which extend both upstream and downstream of the rotary valves. This involves the need for a complicated and expensive arrangement for keeping the several parts of the forming machine, located at some distance apart, at a desired temperature.

Notwithstanding the provision of agitators in the hoppers, conventional forming machines are unable to meter out materials which are highly viscous, such as marzipan.

To provide the required synchronization of the piston movement with that of the rotary valves, as well as of the movement of said rotary valves with the feeding means for the forming molds, highly expensive constructions and apparata are required. Further, prior synchronization arrangements disallow the desired simplicity and "elasticity" of adaptation in the event of the molds, or size thereof, being changed.

Owing to the axial motion of the metering units, the chocolate is metered out discontinuously at markedly long intervals, because one stroke of the pistons must materially take place after another. At the end of the loading, more over, the pistons are exposed to ambient temperature, and are consequently liable to lose some heat.

In the case of forming molds being fed continuously it is is also necessary to reciprocate the forming machine. This involves considerable expenditures in construction, apparata, and energy.

With prior metering units, the loading, or metering and ejection, or delivery phases of the chocolate take place in an indipendent fashion and are neatly separated from one another.

To keep the product under stirring agitation agitators must be provided at the hoppers. Downstream of the hoppers, no agitation of the product will take place, therefore, which tends to cause the product to crowd together.

SUMMARY OF THE INVENTION

In the light of the shortcomings and deficiencies of prior forming machines, it is a primary object of this invention to provide a method and a forming machine for chocolate and the like, which can obviate them and ensure, through a simple and compact modular construction, a one-way mode operation with loading and ejection phases to cover, as well as considerable simplicity of adjustment and accuracy of the chocolate being delivered, and a simple execution of the synchronizations required each time.

It is another object of the invention to provide a forming machine which can operate with a continuous movement of the molds without reciprocating it, since the delivery rate of the product can be varied.

These objects of the invention are achieved by a forming machine characterized in that it comprises, located downstream of the hopper, a contoured mixing and metering cavity accommodating a rotatively driven rotor provided with spaced apart collars and rotary pistons, said rotor defining in said cavity a plurality of movable metering chambers on one side thereof in the form of adjacent annular segments, and on the other side thereof a mixing chamber, into/from said movable metering chambers there is insertable and removable similarly to a movable chamber wall respectively a detent segment of a respective delivery valve carried oscillably and having a delivery conduit with an inlet port to said detent segment, as well as a depression adapted to permit, with the detent segment removed from the associated annular metering chamber, unhindered passage of the related rotary piston above the respective valve.

According to the invention the rotary pistons comprise, respectively, a removable partition bridge provided axially between adjacent collars, which bridges extend between the rotor outer surface and collar outer surface, the latter having respectively a seat for receiving the related rotary piston therein.

Advantageously, according to the invention, the collars have respectively a throughgoing seat, said seats being aligned to one another and the rotary pistons being formed by a single throughgoing transverse strip.

Further, according to the invention, in each oscillating valve, the delivery port of the delivery conduit opens directly into a hole of the forming plate or mold, preferably below the bottom side of the forming machine, whreas the depression has a contour lying on an arc of a circle having substantially the same radius as the outer circumference of the metering chambers in the form of annular segments. The mutual arrangement of the detent segment and cited depression in each valve is such that, during the delivery phase, the common edge corner of said segment and said depression forms a sealing edge against the rotor.

Advantageously, in the case of very viscous and paste-like substances, such as marzipan, according to the invention, a pressing means is provided at the top of the hopper, such as a compressed fluid adduction, or pressing piston, or the like.

The forming method of this invention is characterized in that it comprises the following process steps:

(a) a chocolate loading or metering step by gravity from the hopper into each rotating metering chamber with movable walls;

(b) a chocolate delivery step with a one-way movement from the movable metering chambers;

(c) a step of outward movement of the detent wall, or delivery interruption step;

(d) a chocolate stirring step by translation of the rotary pistons through the stirring chamber; the loading and metering steps taking place substantially simultaneously.

Advantageously, according to the invention, in the instance of highly viscous, or pasty, products, as would be the case with marzipan, the method steps would be performed in the presence of a pressure action applied on the product in the hopper from above, in either a direct or indirect fashion.

Further features may be inferred from the appended subclaims.

This forming machine affords a number of advantages of constructional, functional, and product gentle handling characters.

Its construction is easily implemented, requires but a limited number of component parts, and is highly compact in size. Advantageously, a mechanical seal is used, with no gaskets liable to wear out, and any leaks would remain confined to the interior of the forming machine, thus preventing the product from escaping out and fouling the machine exterior. A further advantage is that a direct passage of the product is provided from the hopper into the metering chamber, which passage would take place by gravity. This, in conjunction with a one-way circular movement in an "accompanying" fashion, results in an extremely gentle handling of the chocolate, and accordingly, does not affect nor destroys the shine of the finished products.

Another important advantage is that the proposed forming machine and method afford handling of the product from the hopper to the molds without its coming into contact with the outside air, or with the environmental bacteria load.

Still another advantage resides in the modular construction, that is in the faculty of lying a number of the inventive modular forming machines side-by-side, without such number being in any way restricted, to form composite products having any number of ingredient qualities.

An additional constructional advantage is that the compact size achieved favors on the one side the favorable thermal inertia to be obtained in operation, and on the other side, a simple temperature control and maintaining arrangement, as well as simple application thereof.

A further constructional advantage resides in that the various rotary metering chambers provided are not subjected to volume variations due to clearances, thereby the metering operations can take place with extremely fine tolerances. This is also accomplished by the easy adjustment of the metering, or delivery stroke length, since by using a one-way rotary motion, it becomes possible to utilize control devices of a very high precision, e.g. a DC drive motor for the rotor combined with an encoder for accurately reading the angular position of the latter. This also simplifies the construction of the required synchronization linkage with the mold actuation.

Furthermore, when changing the forming mold types, it is quickly possible to correspondingly adapt the forming machine, or to replace the rotor assembly with another having a different number of metering chambers, or to exclude some of the chambers of the installed assembly.

Construction-wise, it would also be possible to provide two or more rotary pistons on one rotor.

Advantageously, moreover, the oscillating valves are formed on a common shaft-like element of easy fabrication, and their operation is accomplished in a simple and reliable manner by means of cylinder-piston units.

Yet another advantage of the forming machine proposed consists of that faultlessly constant volumetric output rates can be achieved.

BRIEF DESCRIPTION OF THE DRAWINGS

Further features, advantages, and details of the forming machine according to this invention will be apparent from the following description, with reference to the accompanying drawings, which illustrate a preferred embodiment of a forming machine according to the invention. In the schematical drawings.

DESCRIPTION OF A PREFERRED EMBODIMENT

Figure 1:
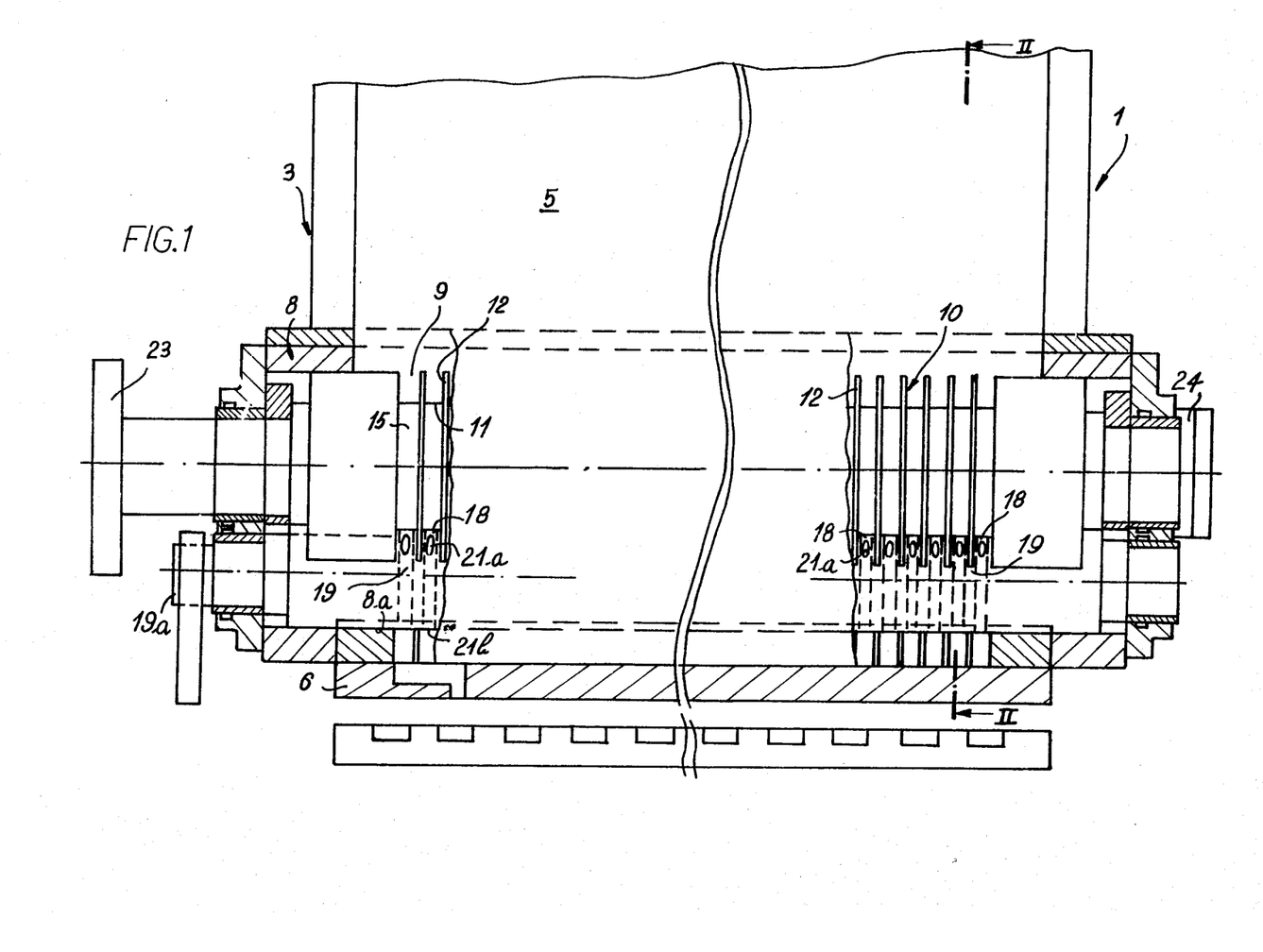
FIG. 1 shows a side elevation view of a forming machine according to the invention, with some parts thereof shown in section.

The forming machine illustrated in the drawings is generally indicated at 1 and comprises two metering assemblies 2 according to the invention, which are provided, for example, for the production of composite or stuffed chocolate candies. The two metering assemblies 2 have the same construction, and accordingly, for simplicity, only one of them will be discussed hereinafter. Indicated at 3 is the hopper, which is divided by a partition wall 4 into two single hoppers 5 individually feeding an associated metering assembly 2. The latter, according to the invention, is provided directly downstream of the associated hopper and has on its bottom side an associated forming plate 6, for conventional spot casting, as shown in the left-hand half of FIG. 2, or alternatively, in the case of tongue casting for chocolate including solid pieces, such as fruit pieces, cooperates directly with the underlying movable molds 7, as shown in the right-hand half of FIG. 2. The metering assembly 2 includes essentially a fixed body 8 having a contoured metering and stirring cavity 9 and being provided at the top with an opening 9a at the open bottom side 5a of the hopper, and at the bottom, an opening 9b for accommodating a cut-off means which will be discussed hereinafter. Inserted in the cavity 9 is a rotor-like moving part indicated at 10. Said rotor has a cylindrical body 11 and, distributed axially thereon at a distance apart from each other, plural collars 12 od a disk-like configuration which may be formed, for example, as a one-piece construction. The same are individually provided with a seat 13, in the example shown a through-going one, for accommodating a bridge-like axial element 14 acting as a rotary piston. For convenience of manufacture in the example shown (refer in particular to FIG. 4), it is contemplated that a single contoured element 14a be employed which can be inserted into said seats 13 and defines all of the required individual rotary pistons, shown separate by a dash-and-dot line.

Figure 2:
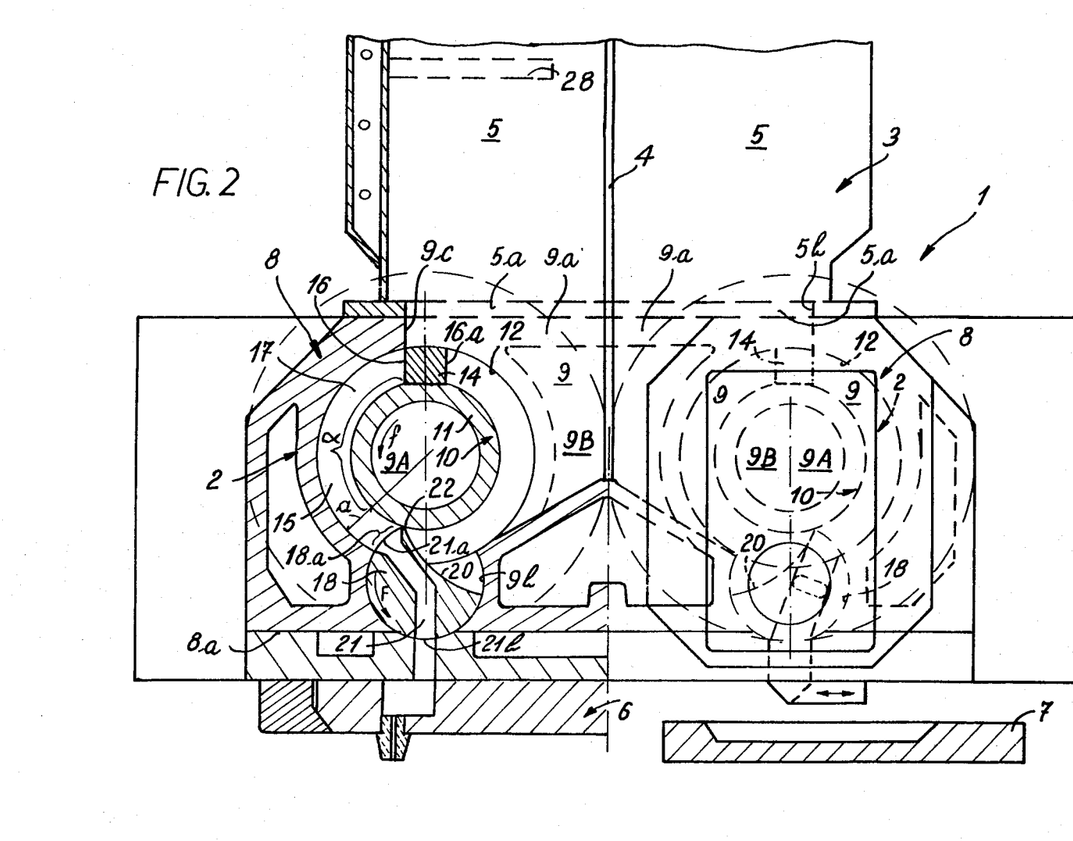
FIG. 2 is a cross-sectional view taken along the line II—II of FIG. 1.
Figure 3:
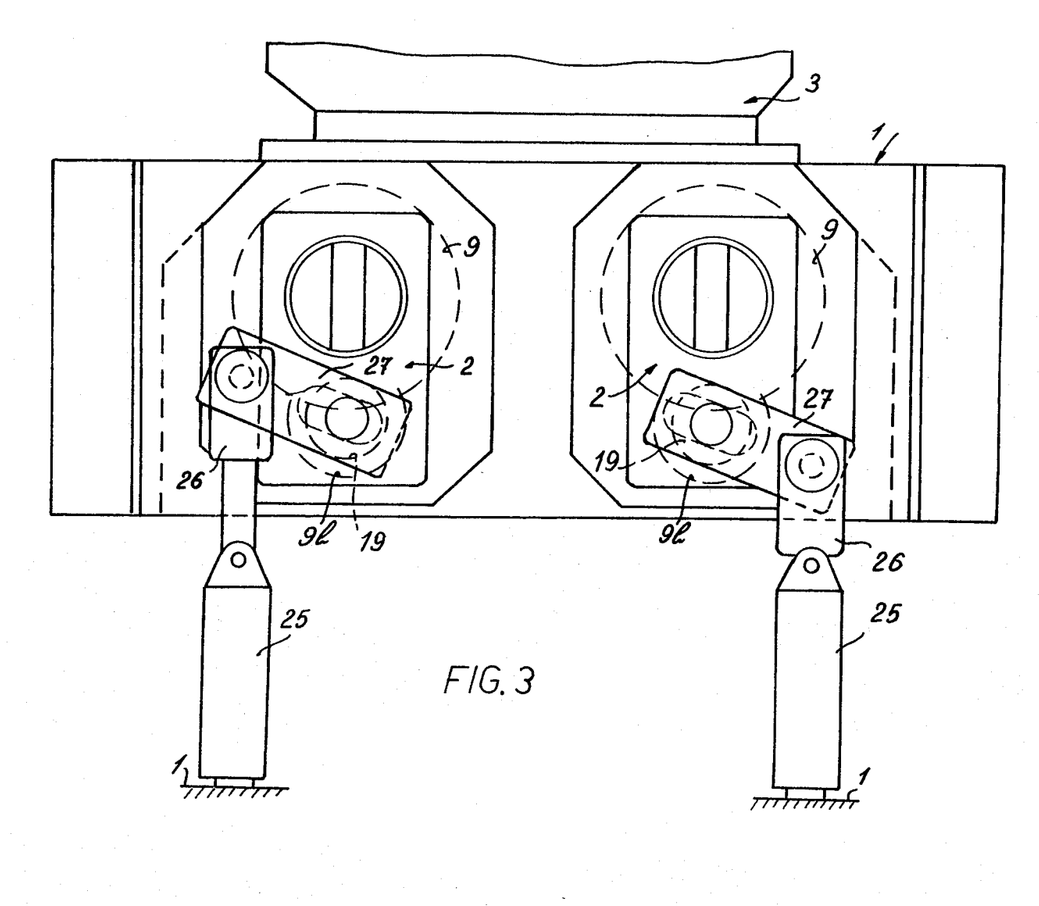
FIG. 3 is a rear view of the forming machine of FIGS. 1 and 2.

As shown more clearly in FIG. 2, the contoured cavity 9 is configured with a cylindrical loading and metering portion 9A and enlarged stirring portion 9B, said portion 9B having a larger size than the portion 9A. The portions 9A and 9B of this embodiment occupy substantially individually one axial half of the cavity 9. On the interior of the cavity 9 in the portion 9A, the disk-like collars 12 define, accordingly, a plurality of individual metering metering chambers 15 forming movable chambers, wherein the one fixed wall is that formed by the bordering wall defined by the inner lateral surface of the cylindrical portion 9A. The leading side 16 of the rotary pistons 14 in the direction of the arrow f forms, therefore, a thrust surface which, upon reaching the lateral side 9c of the opening 9a, will close the respective metering chamber 17 provided and corresponding, in the example shown, to the rotation distance α, on the one side, said metering chamber being closed, on the other side alternately by the detent segment 18a, acting as a movable wall, of an associated oscillating valve 18 of disk-like shape. For convenience of construction, the valves 18 are formed as collars protruding peripherally from a shaft-like core generally indicated at 19 and being accommodated in the cited lower housing opening 9b. Each valve 18 further includes a depression 20 and delivery conduit 21. The latter has an intake port 21a opening into the cited detent segment 18a, as well as a delivery port 21b. Indicated at 22 is the angle formed at the intersection of the detent segment 18a with the depression 20, said corner edge acting as a sealing edge during the delivery phase, as shown in FIG. 2, and cooperates with the outer surface of the cylindrical body 11 of the rotor 10.

As may be seen in FIG. 2, in this embodiment, the depression 20 has a contour of an arc of a circle, and specifically of a circle whose radius is equal to the radius of the inner circumference of the semi-cylindrical portion 9A of the cavity 9. This enables, with the valve 18 swung to cause the removal of the detent segment 18a from the associated annular chamber 17, the unrestricted passage of the respective rotary piston 14 above said valve. As may be seen in FIG. 2, the angular metering stroke a ends, in the example shown, at the line a, which extends at a distance from the detent segment 18a, so as to securely and accurately stop for a short time the rotary motion of the rotary pistons 14 to allow, in a secure and accurate manner, the oscillatory movement of removal of said detent segment 18a from the associated metering chamber 17. In practice, this accuracy of operation can be readily achieved by using the proven rotary driven systems with digitally controlled machine tools, e.g. by using to drive the rotor 10 a DC motor, indicated at 23, which cooperates with an encoder 24 adapted to read the instantaneous angular position of the rotor 11 and stop it at the desired time.

The oscillatory movement of the oscillating valves 18, or of the shaft body 19 thereof, is accomplished, in the example shown, by means of a cylinder-piston unit 25, the connecting rod end 26 whereof engages, through a small intervening connection plate 27, with the end 19a of said shaft-like element 19. A more detailed discussion of this connection will be omitted because such connections are well known per se.

The operation of the inventive forming machine will be next described, and this forming method clarified.

Beginning with the position shown in FIG. 2, the rotation of the rotor 10, or of the movable metering chambers 15, in the direction of the arrow f, produces a corresponding circular displacement of the rotary pistons 14, which function as a rear closure wall for said movable metering chambers 15, whereas the front movable wall thereof is formed each time by the respective detent segment 18a. The chocolate, or the like stock, completely fills such annular chambers 15, or metering ones 17, because it flows continuously down by gravity into them, or into the semicylindrical portion 9A and stirring one 9B. With detent segments 18a inserted into the annular chambers 15, as shown in FIG. 2, the advance movement of the rotary pistons 14 beyond the lateral side 9C of the top opening 9a results in the product located in front of said pistons 14 being delivered through the throughgoing conduits 21 in the valves 18. Upon the leading side 16 of the rotary pistons 14 reaching the preset stop line a, or on completion of the metering stroke a of the metering chamber 17 each time involved, the rotor 10 is momentarily stopped, during which time the cylinder-piston unit 25 will cause the valves 18 to oscillate in the direction of the arrow F, or removal of the detent segments 18 from the rotary chambers 15, with simultaneous interruption in the delivery of product. During that delivery stroke, downstream of the trailing side 16a of the rotary pistons 14 in the annular chambers 17, the chocolate will automatically enter them by gravity. Thus, there simultaneously occur a metering, or product delivery, phase upstream of the piston 14 and a loading phase of the product downstream of said piston. This is made possible by that, according to the invention, a one-way circular motion is utilized for metering out the product. This further enables the delivered amount to be adjusted at will, or in accordance with the casting plates or molds used each time, by varying the length of the angle segment a, which can be read in a most accurate and reliable way by apparata of the encoder type, as shown, or the like.

After moving past the depressions 20, the rotary pistons 14 perform, through the stirring portion 9B, a translation stroke to again locate themselves at the lateral side 9c of the inlet opening 9a for the product to the underlying chambers 9A and 9B. During this translation stroke, the leading wall 16 of the rotary pistons 14 moves the product upwards which is located within the stirring portion 9B, thus causing the product to mix. With the cited method, there occur two momentary stops of the rotor, and specifically, with pistons 14 at that portion of the line a which delimits the extension each time desired for the metering chamber, and during the stirring phase, or with rotary pistons at the lateral detent side 9c to await consent to the arrival, or readiness, of the underlying molds. However, it would also be possible to provide a mode of operation wherein the rotor is rotated continuously.

According to an advantageous variation of the invention, in order to also utilize this translation stroke to effect a metered delivery of product, the rotor 10 may be provided with a plurality of sets of rotary pistons, uniformly spaced apart, for example two sets of diametrically opposed rotary pistons, or several sets, depending on the diameter of the disk collars 12 and the mutual distance between said disks 12, or in accordance with the "displacement" of the movable annular chambers 15.

The oscillation of the valves 18 in the opposite direction to the arrow F, that is, the insertion of their detent segments 18a into the associated movable annular chambers 15, is controlled at the desired time, that is upon the rotary pistons 14 reaching the cited lateral detent side 9c, which position would be advantageously detected through the cited encoder 24 or the like.

Also to be noted is that the delivery port 21b of the conduit 21 opens, in the example shown, below the lower plane 8a of the body 8 of the forming machine 1, thereby the conduits leading from the conventional rotary valves to said lower plane 8a may be omitted. In the case of forming molds, that is, for tongue casting, said throughgoing conduit 21 would be provided with a slotted opening, as shown schematically in FIG. 2, at the right-hand metering assembly 2.

In the case of highly viscous or pasty products being handled, such as with marzipan, optimum results have been secured by applying a pressure action from above on the product in the hopper, as diagramatically indicated at 28. That action may be provided by the inclusion of a pressing piston, or of a pressurized fluid, e.g. within an expandable container. This pressing step is carried out throughout the processing steps of this forming method.

Figure 4:
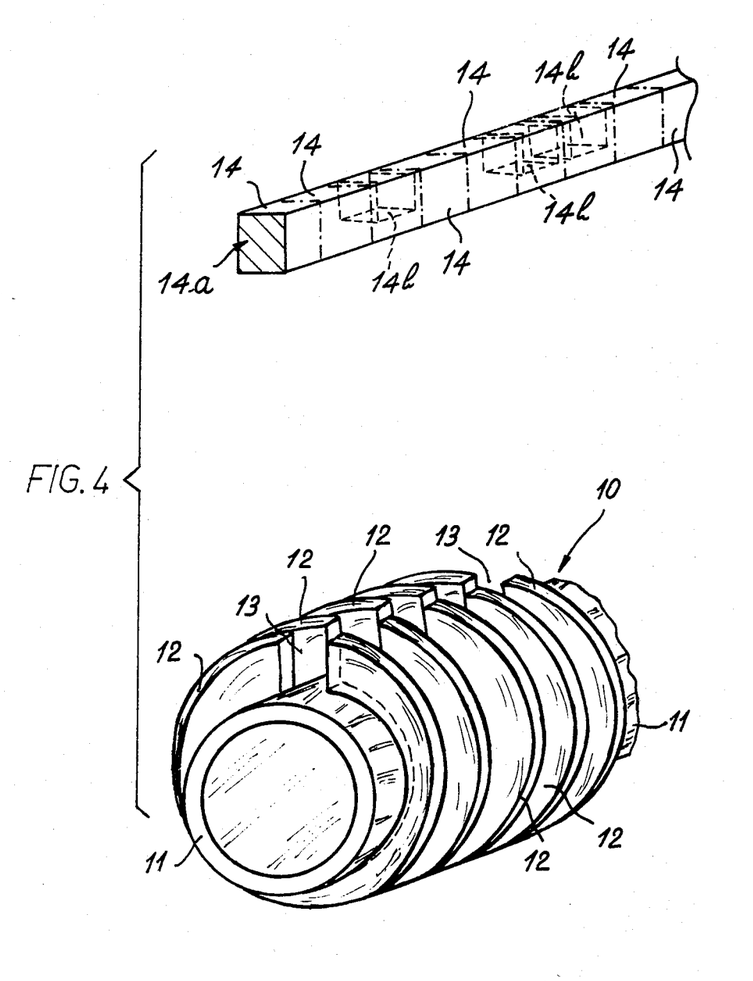
FIG. 4 is a perspective, enlarged scale detail view of a rotary piston rotor according to the invention, the pistons, which are a single contoured piece, being shown separately for clarity of illustration.

In FIG. 4, portions of the contoured element 14a which form the individual pistons 14 are shown to include depressions 14b, indicated with dotted lines, which are effective to exclude the delivery of chocolate into the respective rotary metering chambers 17, where necessary.

It may be appreciated from the foregoing that the forming method and machine of this invention effectively achieve the invention objects and afford the advantages listed in the preamble.

In particular, the functional advantages are secured which relate to a gentle treatment of the product, as well as to the exclusion of air bubbles and to the suppression of outward product leaks, as well as of a satisfactory volumetric output, in the simultaneous presence of structural advantages relative to a greatly simplified construction, to a construction providing a small number of component parts, and to a modular construction, with the modules whereof compact forming machines may be fabricated to deliver any desired number of products. At the same time, with the one-way rotary motion provided, it becomes possible to use extremely simple drive and adjustment means and devices, which would be reliable and easy to adjust and may be advantageously combined with a control unit in the form of a computer, or data processor, for automating the production cycle, or change it.

A further important advantage of this forming machine is that it may be included with existing plants without involving any major modifications for its adaptation. Advantageously avoided are reciprocating motions, which additionally to involving increased space requirements also require two stops with reversal of the movement at each delivery, and the use of sealing gaskets, while reducing to a minimal value the magnitude of the friction surfaces. In all cases, the absence of parts in contact with the chocolate stock and moved to become exposed to the ambient air rules out the formation of the cited hardened films resulting in seizure, while it also prevents in a reliable fashion the product from contacting the ambient bacteria load. The compact construction allows, moreover, an improved utilization of the thermal inertia of the metal parts, as well as an easy fabrication and application of the heating system. Further, with the forming machine proposed, it becomes possible to process any moldable products, such as chocolate, nougat, sugar candies, marzipan, etc., and to effect spot or tongue castings. The metering units of this invention may also be provided directly at the bottom portions of the associated hoppers.

The oscillating valves 18 could be replaced with comb-like elements performing a reciprocating, rather than rotary, motion, or the like. Furthermore, the cylinder-piston control units for the oscillating valves could be replaced with rack-and-pinion or the like control devices. Also, the construction of the metering assembly could be reversed, in that the disk collars 12 would be provided rigid with the metering and stirring cavity 9 and the rotary pistons 14 provided on the cylindrical body 11 of the rotor 10. With the latter embodiment, instead of the rotor 10, the forming portion which defines the metering and stirring cavity 9 may be driven rotatively.

In practicing the invention, individual parts may be replaced with other technically and/or functionally equivalent ones, without departing from the protective scope of the instant invention.

I claim:

1. A machine for use in forming chocolate and the like, comprising at least one hopper containing a product to be delivered, characterized in that it includes, located downstream of said hopper, a contoured metering and stirring cavity accommodating a rotatively driven rotor provided with spaced apart collars and rotary pistons, said rotor defining in said cavity a plurality of movable chambers on one side thereof in the form of chambers with annular adjacent metering segments, and on the other side thereof, a stirring chamber, a delivery valve located downwardly of each rotor and being mounted for oscillating movement, said delivery valve having a detent segement for movement into and from said movable chambers in the nature of a movable wall, said delivery valve having a delivery conduit with an intake port to said detent segment, and a passage depression adapted to permit, with said detent segment removed from the associated annular metering chamber, the unhindered passage of the related rotary piston above the respective delivery valve.

2. A machine according to claim 1, characterized in that the rotary pistons comprise respectively a partition bridge provided between two adjacent collars, said rotary pistons extending between the outer surface of the rotor cylindrical body and the outer lateral surface of said collars, said collars being respectively provided with a seat for receiving said rotary piston therein.

3. A machine according to claims 1 or 2, characterized in that said collars have a respective throughgoing seat therein, said seats being aligned to one another, and that said rotary pistons comprise a single contoured member extending axially with respect to the cylindrical body of said rotor, with said rotary pistons being provided detachable, the connection thereof to the cylindrical body of said rotor being accomplished by means of screws.

4. A machine according to claim 2, characterized in that the cylindrical body of said driven rotor and said collars are constructed of pieces made rigid together.

5. A machine according to claim 1, characterized in that the delivery port of the through-going conduit of each oscillating delivery valve opens into the bottom side of said forming machine, there being a mold located downwardly of said delivery valve, said mold having an opening for direct communication with said valve.

6. A machine according to claims 1 or 5, characterized in that said oscillating delivery valves are provided with a disk-like configuration and formed on a shaft-like core, said oscillating valves projecting downwardly from the bottom side of said forming machine.

7. A machine according to claim 1, wherein said depression in said oscillating delivery valves follows the contour of an arc of a circle having the same radius as the inside circumference of the semicylindrical portion of the metering and stirring cavity housing said rotary piston rotor.

8. A machine according to claim 1, characterized in that the arrangement of said detent segment and passage depression on said oscillating valves is such that during the metering, or loading, phase with the detent segment inserted in the associated annular chamber, the common corner edge to said segment and said depression forms a sealing edge cooperating with the outer surface of the cylindrical body of said rotor.

9. A machine according to claim 1, characterized in that for driving and stopping said rotary piston rotor, an arrangement is provided for easily driving and controlling the angular movement comprising, for example, a DC motor associated with an encoder for reading the angular position of said rotor.

10. A machine according to claim 1, characterized in that said oscillating delivery valves are provided in the form of disk-like collars protruding comb-like from a shaft-like supporting core.

11. A machine according to claims 1 or 10, characterized in that the drive for said oscillating delivery valves comprises a cylinder-piston unit with an intervening small plate interconnecting the free end of the piston rod of said unit and a free end of said shaftlike portion having said valves.

12. A machine according to claim 1, characterized in that to exclude the delivery of product to some of said annular metering chambers, those rotary pistons which are associated with said chambers to be excluded are provided with a peripherally extending depression, said depression being closeable by a block type of closure element removably attachable by means of screws.

13. A machine according to claim 1, characterized in that provided at the top of said hopper is a pressing means, such as a compressed fluid intake, in an expandable container, a pressing ram, or the like.

14. A machine according to claim 1 characterized in that it comprises a modular type of construction and two or more hoppers with as many metering assemblies arranged serially together in side-by-side relationship.

15. A machine according to claim 1, wherein said disk-like collars are provided associated with the forming machine body defining said metering and mixing chamber, or formed on said body, the cylindrical body of said rotor including said rotary pistons.

16. A machine according to claim 1 characterized in that it comprises a plurality of modular forming machines.

17. A machine according to claims 1 or 16, characterized in that said metering assemblies include individual, or independent, drives.

* * * * *